(12) United States Patent
Bowen et al.

(10) Patent No.: US 6,579,600 B1
(45) Date of Patent: Jun. 17, 2003

(54) MULTILAYER CAPACITOR AND METHOD

(75) Inventors: Leslie J. Bowen, Concord, MA (US);
Brian G. Pazol, Tyngsboro, MA (US);
Craig D. Near, Acton, MA (US);
Richard L. Gentilman, Acton, MA (US)

(73) Assignee: Materials Systems, Inc., Littleton, MA (US)

( * ) Notice: Subject to any disclaimer, the term of this patent is extended or adjusted under 35 U.S.C. 154(b) by 1126 days.

(21) Appl. No.: 08/686,495

(22) Filed: Jul. 25, 1996

(51) Int. Cl.⁷ .......................... B32B 27/14; B32B 23/02; B32B 15/00; B32B 17/00
(52) U.S. Cl. ................... 428/198; 428/192; 428/209; 428/210; 428/901
(58) Field of Search ................. 428/192, 209, 428/210, 198, 901

(56) References Cited

U.S. PATENT DOCUMENTS

| | | | | |
|---|---|---|---|---|
| 3,679,943 A | * | 7/1972 | Bergmann | 317/230 |
| 3,879,645 A | * | 4/1975 | Rutt et al. | 317/258 |
| 3,965,552 A | * | 6/1976 | Rutt | 29/25.42 |
| 4,071,880 A | * | 1/1978 | Rutt | 361/309 |
| 4,243,710 A | * | 1/1981 | Magrini et al. | 428/208 |
| 4,353,957 A | * | 10/1982 | Rutt et al. | 428/292 |
| 4,587,528 A | | 5/1986 | Beaudet | 346/75 |
| 5,340,510 A | * | 8/1994 | Bowen | 264/22 |
| 5,520,992 A | * | 5/1996 | Douglas et al. | 428/209 |
| 5,597,494 A | * | 1/1997 | Kohno et al. | 216/6 |

* cited by examiner

Primary Examiner—S. H. VerSteeg
(74) Attorney, Agent, or Firm—Pearson & Pearson, LLP

(57) ABSTRACT

A multilayer capacitor includes a unitary, net-shape molded dielectric ceramic body having first and second cavities molded into at least one side to divide the ceramic body into a plurality of ceramic layers disposed generally parallel to the top. The first cavities alternate with the second cavities in the ceramic body. Each of the ceramic layers except an uppermost and a lowermost of the ceramic layers is joined at one edge to one ceramic layer adjacent thereto by a first ceramic bridge and at the same or a different edge to another ceramic layer adjacent thereto by a second ceramic bridge. The first and second cavities are filled with one or more materials to form first and second electrically conductive electrode layers, respectively, each electrode layer being bonded to the ceramic layers adjacent thereto. The first electrode layers are electrically interconnected to provide a first set of electrode layers, and the second electrode layers are electrically interconnected to provide a second set of electrode layers alternating with and electrically isolated from the first set electrode layers in the body.

9 Claims, 6 Drawing Sheets

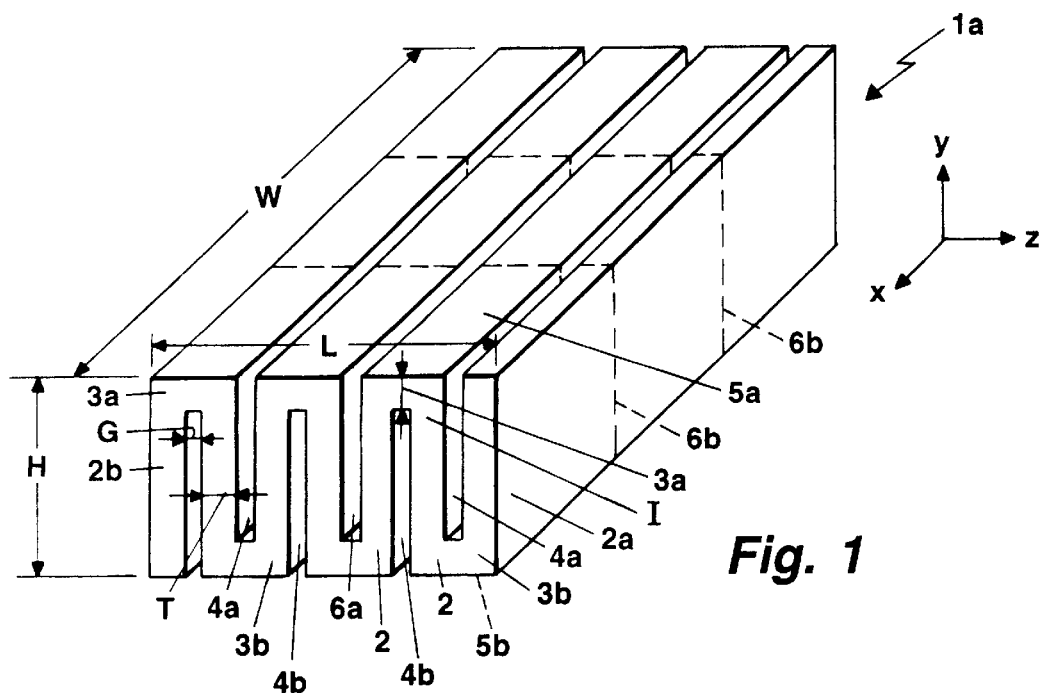
Fig. 1
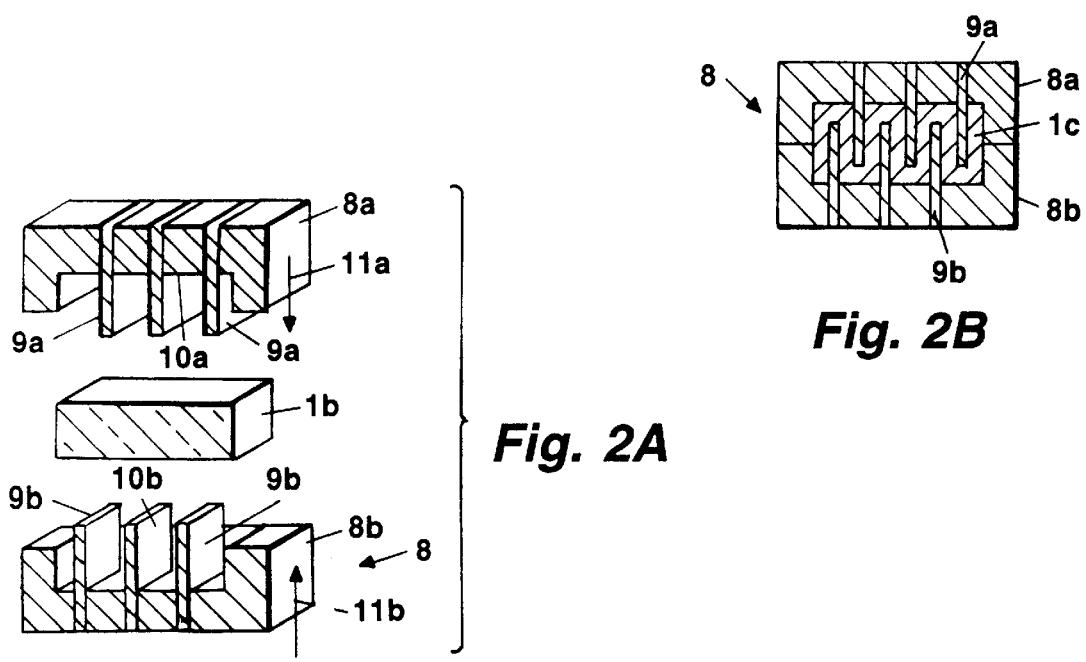
Fig. 2A
Fig. 2B

MULTILAYER CAPACITOR AND METHOD

CROSS-REFERENCE TO RELATED APPLICATIONS

This application is related to U.S. patent application Ser. No. 08/686,496, now abandoned filed on even date herewith and incorporated herein by reference.

BACKGROUND OF THE INVENTION

The present invention relates to capacitors, and particularly to capacitors having multiple ceramic layers. Such capacitors are useful for storage of electric charge in electronic circuits, e.g., as conventional or surface-mounted components.

Multilayer capacitors are those having multiple layers of laminated dielectric ceramic material separated by electrode material. The advantages offered by such multilayer devices include higher capacitance than conventional devices having two electrodes separated by a single dielectric layer.

Presently available multilayer capacitors are expensive to fabricate, because they are fabricated by stacking premetallized green ceramic layers using various processes that involve a number of critical laminating and indexing steps. The green ceramic layers are typically fabricated from sheets made by tape casting or roll compaction methods. Many currently used processes require the application of costly noble metal electrodes between ceramic layers, because the ceramic and electrode layers must be assembled into a stack before the ceramic is fired and only noble metals, e.g., platinum or palladium alloys, will withstand the high temperature necessary for sintering the ceramic after such assembly. The requirement for such noble metal internal electrode layers contributes to the high cost of currently available multilayer capacitors. Such fabrication processes present problems with indexing and stacking faults and bond delamination. Additionally, the number of ceramic layers in the multilayer capacitor is limited by the number of ceramic layers that can practically be laminated and by the binder burn-out problems associated with the current roll compaction or tape casting ceramic layer fabrication methods.

One disadvantage of the stacking methods described above is that, to achieve the maximum benefit from the multilayer configuration, thin ceramic layers (typically about 10–1000 $\mu$m thick) are desired. For a large capacitor, the stacking of many layers is therefore required to achieve the desired overall capacitance, exacerbating the problems of indexing and stacking faults, bond delamination, and reliability.

Another known multilayer capacitor is built up from stacked and laminated green ceramic tapes produced by conventional tape casting techniques. Planar internal cavities are produced within this structure in a multilayer configuration by screen printing the tapes prior to lamination with pads of binder rich ceramic ink. After lamination, the tape casting binder and the binder rich ink are burned away and the parts are sintered, yielding a multilayer structure of dense ceramic layers separated by porous planar ceramic layers in the pattern of the desired interdigitated internal electrodes. The internal electrodes are then formed by back-filling these internal porous layers with molten metal or other conductive material. This process, however, is still hampered by the limitations imposed by the above-described indexing and stacking faults. Also, the number of ceramic layers of the multilayer structure is still limited by the number of ceramic layers that can practically be laminated and by the binder burn-out problems associated with current tape casting ceramic layer fabrication methods.

Accordingly, it is an object of the present invention to provide a multilayer capacitor which overcomes the disadvantages of the prior art.

It is another object of the invention to provide a multilayer capacitor having high capacitance which can be more economically fabricated than those found in the prior art.

It is yet another object of the invention to provide net-shape forming techniques for readily and economically fabricating a multilayer capacitor.

SUMMARY OF THE INVENTION

In accordance with these objects, in one aspect the invention is a method of fabricating a multilayer capacitor. The method involves net-shape molding from a mixture of a dielectric ceramic powder material and an organic binder a unitary dielectric ceramic body including a top, four sides normal to the top, and a base interconnecting the sides. First and second cavities are molded into at least one side to divide the ceramic body into a plurality of ceramic layers disposed generally parallel to the top. The first cavities alternate with said second cavities in the ceramic body. Each of the ceramic layers except an uppermost and a lowermost of the ceramic layers is joined at one edge to one ceramic layer adjacent thereto by a first ceramic bridge and at the same or a different edge to another ceramic layer adjacent thereto by a second ceramic bridge. The binder is removed from the ceramic body, and the body is sintered at a temperature and for a time to densify the body to near theoretical density. The first and second cavities are filled with one or more materials to form first and second electrically conductive electrode layers, respectively, each electrode layer being bonded to the ceramic layers adjacent thereto. The first electrode layers are electrically interconnected to provide a first set of electrode layers, and the second electrode layers are electrically interconnected to provide a second set of electrode layers alternating with and electrically isolated from the first set electrode layers in the body.

In another aspect, the invention is a multilayer capacitor including a net-shape molded, densified, unitary dielectric ceramic body having a top, four sides normal to the top, and a base interconnecting the sides. The capacitor further includes a plurality of ceramic layers including an uppermost ceramic layer, a lowermost ceramic layer and one or more intermediate ceramic layers all disposed generally parallel to the top. Each intermediate ceramic layer is joined at one edge to one ceramic layer adjacent thereto by a first ceramic bridge and at the same or a different edge to another ceramic layer adjacent thereto by a second ceramic bridge. The capacitor has plurality of electrode layers including an electrode layer between and bonded to each adjacent pair of ceramic layers, the electrode layers nearly completely separating the adjacent pair of ceramic layers. The electrode layers are divided into a first set of electrode layers and a second set of electrode layers. The first set electrode layers alternates with the second set electrode layers in the body. The electrode layers of each set is electrically interconnected with one another and is electrically isolated from the electrode layers of the other set in the body.

In a narrower embodiment, the plurality of electrode layers of the capacitor further includes a lower electrode layer on the base, and the first set of electrode layers includes the lower electrode layer.

In another narrower embodiment, the first and second electrode layers of the capacitor extend into the ceramic body from, respectively, a first of said sides and a second of said sides opposite said first side. The first electrode layers alternate with the second electrode layers in the ceramic body, and each of the ceramic layers except an uppermost and a lowermost of the layers is joined at one edge to one ceramic layer adjacent thereto by a first ceramic bridge and at an opposite edge to another ceramic layer adjacent thereto by a second ceramic bridge such that the ceramic body has a serpentine cross-section.

In yet another narrower embodiment, the first and second electrode layers of the capacitor extend into a first side [one of said sides], the first electrode layers alternating with the second electrode layers in the capacitor. The ceramic bridges join the ceramic layers at edges along a second side of the ceramic body opposite the first side such that the ceramic body has a comb-shaped cross-section. Each of the electrode layers includes a lug integral therewith and including an electrically conductive material extending into the bridge adjacent thereto over a minor portion of the length of the bridge. The first lugs align with one another, while the second lugs align with one another but not with the first lugs. The lugs are exposed at the second side of the ceramic body. The first lugs are electrically interconnected with one another and the second lugs are electrically interconnected with one another to provide the first and second set, respectively, of electrode layers.

BRIEF DESCRIPTION OF THE DRAWINGS

For a better understanding of the present invention, together with other objects, features, advantages, and capabilities thereof, reference is made to the following Description and appended Claims, together with the Drawing in which:

FIG. 1 is a perspective view of a sintered barium titanate ceramic blank used for fabrication of the multilayer capacitor of FIG. 3;

FIG. 2A is a schematic cross-sectional perspective view of the molding apparatus and green dielectric preform of the blank of FIG. 1, before molding;

FIG. 2B is a schematic cross-sectional elevation view of the molding apparatus and green dielectric preform of the blank of FIG. 1, after molding;

DETAILED DESCRIPTION OF THE PREFERRED EMBODIMENTS

Figure 3:
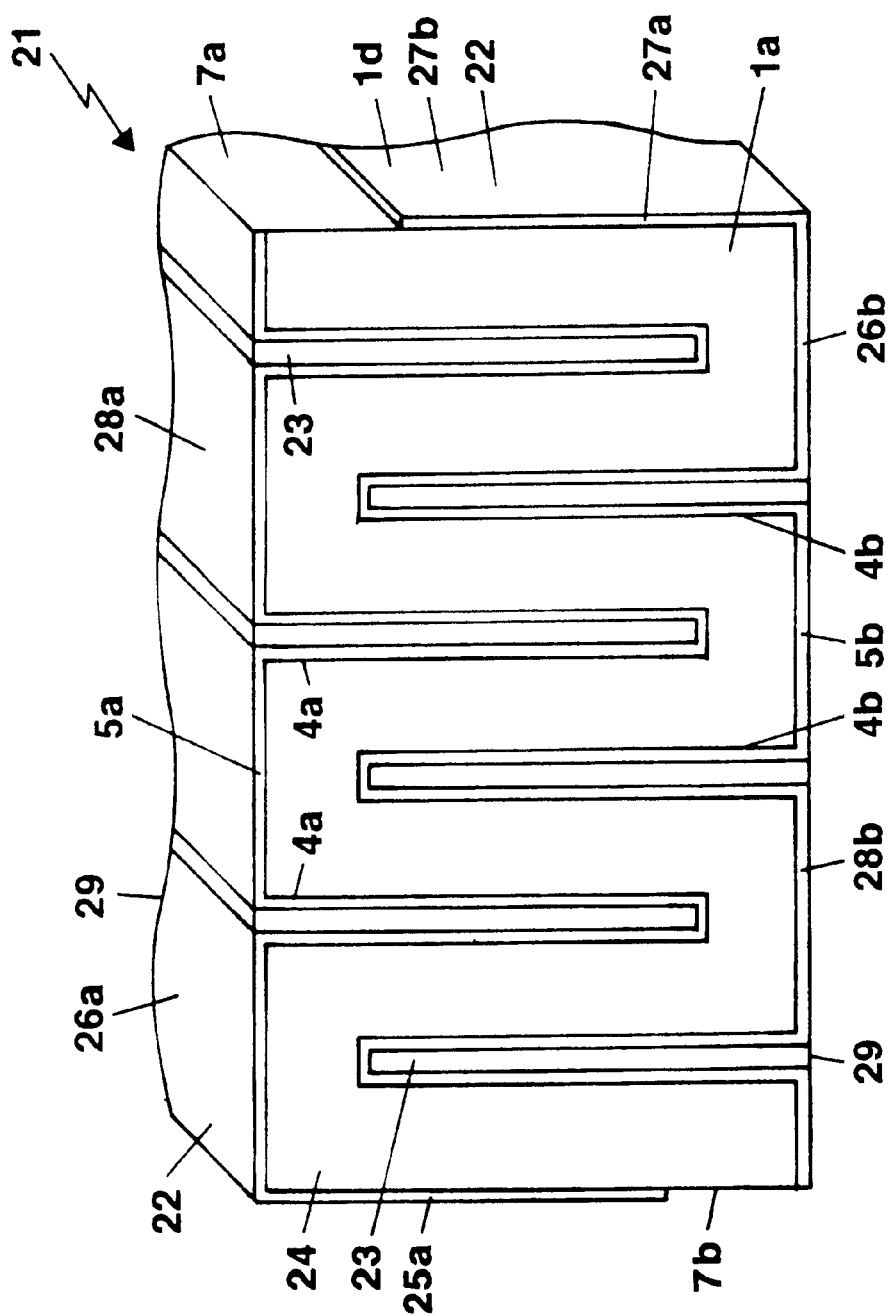
FIG. 3 is a perspective view of a multilayer capacitor in accordance with one embodiment of the present invention.

The description below of various illustrative embodiments shown in the Drawings is not intended to limit the scope of the present invention, but merely to be illustrative and representative thereof.

In its several embodiments, the multilayer capacitor described herein is fabricated from a multilayer ceramic blank net-shape molded from a dielectric ceramic. Examples of such dielectric ceramics are well known in the art, and include but are not limited to titanates of, e.g., barium or strontium, lead lanthanum zirconate niobate, lead magnesium niobate, or zirconates or niobates of, e.g., lead, barium, or strontium, or a derivative of any of these. Hereinafter the term "dielectric" will be used to refer to any of these ceramic materials.

FIG. 1 illustrates an example of such a blank, showing sintered barium titanate blank $1a$ of width W, height H, and length L (in the x, y, and z dimensions, respectively, as shown in FIG. 1). Blank $1a$ has multiple parallel ceramic layers 2 of thickness T, interconnected by inactive bridging portions $3a$ and $3b$ of thickness I at alternating edges of layers 2, forming a ceramic body of serpentine cross-section. Alternating gaps or cavities $4a$ and $4b$ of thickness G entering blank $1a$ from opposite side surfaces $5a$ and $5b$ of blank $1a$ are interposed between layers 2 to separate the layers.

Blank $1a$ is shown as having seven ceramic layers 2. However the ceramic layers in a capacitor may vary from two to 1000, or even several thousand layers, while the thickness of each layer is typically about 10–1000 $\mu$m and the length (z-dimension) of the capacitor is typically about 0.1–10 mm, depending on the application for which the capacitor is designed. The method described herein makes possible the net-shape molding of a capacitor having several thousand thin layers, each being, e.g., as thin as about 20 $\mu$m. Cavities $4a$ and $4b$ define the thickness of the electrode layers in the finished capacitor, typically 10–100 $\mu$m.

If desired, the outer dimensions, i.e., width W and length L of sintered blank $1a$ may be molded slightly oversize so that the width and length may be modified after sintering and electroding to fine-tune the device to a preselected capacitance. Also if desired, length L of sintered blank $1a$ may be sufficiently large to provide two or more individual capacitors, the blank being cut or "diced out" at a bridge $3a$ or $3b$ (as at cut $6a$) before or after the electroding step described below. Also, conveniently, blank $1a$ may be of sufficient depth H to provide two or more capacitors, the individual capacitors typically being "diced out" from one another (as at cuts $6b$), this separation normally being performed at a later stage in the fabrication process, as described further below.

FIGS. 2A and 2B illustrate net-shape fabrication of the ceramic blank shown in FIG. 1. As shown in FIG. 2A, molding apparatus, or tooling, 8 includes upper and lower mold halves $8a$ and $8b$, respectively. For compression molding, mold halves $8a$ and $8b$ are heated by means well known in the art for heating molding apparatus. For injection molding, the molding apparatus includes a gate (not shown), as is well known in the art, for filling the mold. Each of mold halves $8a$ and $8b$ has a number of longitudinal blade inserts $9a$ and $9b$, respectively, separating longitudinal cavities $10a$ and $10b$, respectively. As shown in FIG. 2B, blade inserts $9a$ and $9b$ are disposed to alternate in an interdigital pattern within the closed mold to define a mold cavity which is the negative of the desired blank, i.e., serpentine, multilayered green blank $1c$. Conveniently, blade inserts $9a$ and $9b$ may be retractable for ease of removal of the blank after molding and cooling. Alternatively, the blade inserts may be fixed within the mold cavity. Also alternatively, both the blade inserts and longitudinal cavities $10a$ and $10b$ may be provided by removable and replaceable inserts set into each mold half to define different mold cavity shapes for different electrode spacings and electrode and ceramic layer thicknesses. Thus, a set of differently sized and shaped blade inserts may be used to fabricate a variety of different molded ceramic blanks.

In one exemplary method, a ceramic blank is compression molded by placing green preform 1b between mold halves 8a and 8b. Preform 1b is fabricated from a ceramic-binder mixture of a dielectric ceramic powder mixed with a thermoplastic organic binder, e.g., a wax. Alternatively, a thermosetting organic binder may be mixed with the ceramic powder. The temperature of apparatus 8 should be slightly greater than the softening temperature of the ceramic-binder mixture. As heated mold halves 8a and 8b are brought together, as illustrated by arrows 11a and 11b of FIG. 2A, with pressure sufficient to deform preform 1b at the selected mold temperature, heated blade inserts 9a and 9b penetrate into ceramic preform 1b. The displaced material of preform 1b flows into longitudinal cavities 10a and 10b forming prefired ceramic green body 1c, as shown in FIG. 2B.

In another exemplary method, blank 1a is fabricated by injection molding a hot ceramic-binder mixture into chilled, closed mold 8 (the mold being cooled to a temperature sufficient to solidify the mixture) to form prefired green body 1c. This molding method is performed in a manner similar to that described for injection molding of piezoelectric ceramic bodies in U.S. Pat. No. 5,340,510, incorporated herein by reference.

In either method, after molding, cooling and, e.g., retracting blade inserts 9a and 9b from the mold cavity, blank 1c is removed from the mold. The binder is removed from blank 1c by slow heating in a conventional manner, and the part is sintered to consolidate the blank to near (at least 93% of) theoretical density, as is also known in the art, forming sintered blank 1a described above. Blank 1a then is prepared for use in a multilayer capacitor as described below.

FIG. 3 illustrates individual electroded capacitor 21, fabricated from sintered serpentine blank 1a of FIG. 1. The entire surface of blank 1a is plated or coated with thin layer 22 of any conventional electrically conducting material. For example a metal such as nickel, silver, or gold may be applied by any suitable conventional process such as vapor metallization, sputtering, or electroless plating. Layer 22 may be, if desired, sufficiently thin to avoid bridging of the layer across gaps 23 in slits or cavities 4a and 4b between ceramic layers 2a and 2b. Alternatively, longitudinal cavities 4a and 4b may be filled with the conductive material used for the coating, or may be filled with another conductive material, as described below. Excess plating is removed from side surface 24 and the side surface opposite thereto, and from a small portion of each of blank top 27a and blank base 25a, as uncoated strips 7a and 7b, respectively. (Hereinafter, both side surfaces will be referred to as side surfaces 24.) Alternatively, side surfaces 24 and uncoated strips 7a and 7b may be masked during plating. (If blank 1a has been diced to divide the blank into two or more devices, as described above, at least some of this masking or plating removal will be unnecessary.)

Thus conductive layer 22 is divided into two continuous electrodes, 26a and 26b, electrically isolated from one another by uncoated strips 7a and 7b and side surfaces 24, to form electroded blank 1d. As shown in FIG. 3, electrode 26b extends across top surface 27a of electroded blank 1d, down one electroded side 28b, and into longitudinal cavities 4b. Electrode 26a extends across base 25a of electroded blank 1d, up other electroded side 28a, and into longitudinal cavities 4a.

If conductive layer 22 extends into longitudinal cavities 4a and 4b, as shown in FIG. 3, a non-conductive filler, e.g., a rubber or a thermosetting polymer such as an epoxy resin or a polyurethane may be used to fill gaps 23, as filled portions 29, to consolidate the electrodes in cavities 4a and 4b. Alternatively, gaps 23 or uncoated cavities 4a and 4b may be filled with an electrically conductive material, such as a metal-filled epoxy resin or other polymer, e.g., a silver-epoxy resin, or a metal, after layer 22 is applied. Also alternatively, gaps 23 or uncoated cavities 4a and 4b may be filled with an electrically conductive glass frit, e.g., a flowable mixture of glass frit and silver powder, then cured or dried and fired. Gaps 23 may also be filled with a non-conductive glass frit in a similar manner. By eliminating entrapped air with a vacuum atmosphere and using a diluted, flowable silver-epoxy material and pressure assisted infiltration, complete filling of the uncoated cavities or coated gaps with silver-epoxy resin is readily achieved.

Typically, each individual capacitor 21 has a footprint (in the x-y plane) of about 0.2×0.2 mm to 20×20 mm. and a length of about 0.1–10 mm. In operation, capacitor 21 may be activated by separately connecting electrodes 26a and 26b to a source of electrical power. If electroded blank 1d has not, as yet, been separated into individual capacitor portions along one or more x-z planes, as described above, this separation, if desired, may be performed after electroding.

Figure 4A:
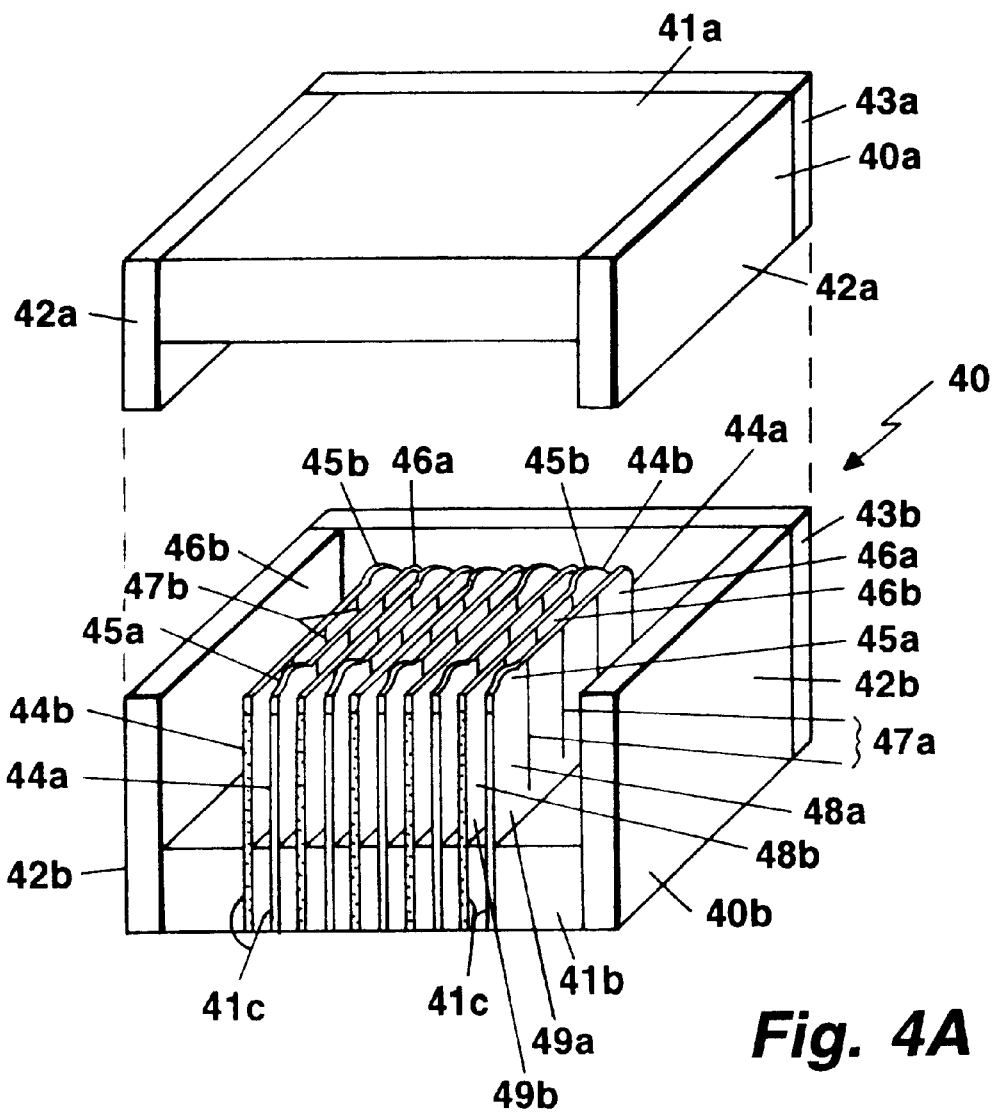
FIGS. 4A and 4B are schematic perspective views of molding apparatus (tooling) for molding a dielectric ceramic blank for fabricating a multilayer capacitor in accordance with another embodiment of the invention.
Figure 4B:
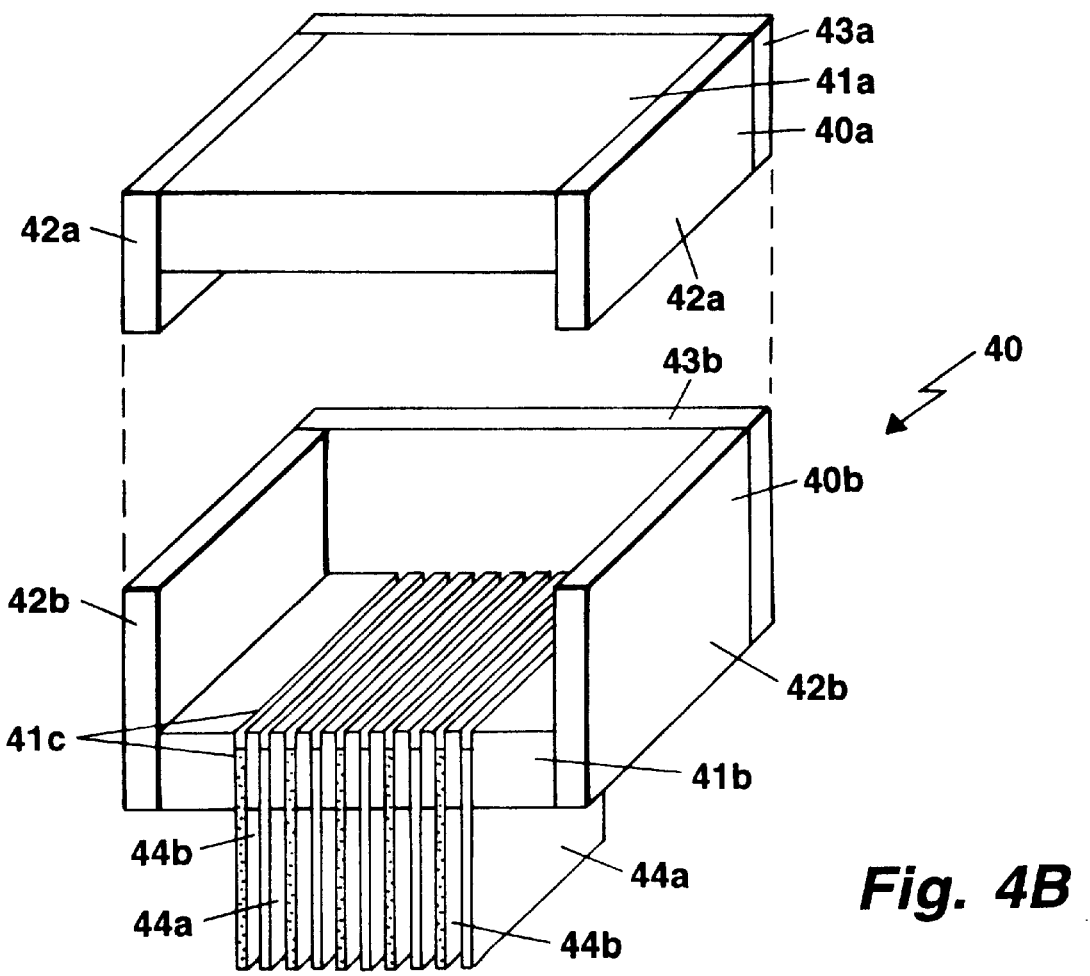

Another exemplary embodiment of the multilayer capacitor in accordance with the invention includes electrodes which may be connected to an electrical circuit from a single side of the capacitor. Molding apparatus, or tooling, for fabricating this capacitor is illustrated in FIGS. 4A and 4B. Mold 40 includes upper and lower mold halves 40a and 40b, respectively, each including a base, 41a and 41b, respectively, end walls 42a and 42b, respectively, and side walls 43a and 43b, respectively. (Only the rear side wall of each mold half is shown, for clarity of illustration.)

Base 41b of lower mold half 40b includes at least four slots 41c into which are inserted at least two of each of first and second mold blade inserts, 44a and 44b, respectively, as shown in FIG. 4A. Each of blade inserts 44a includes a lug 45a projecting upwardly from its top edge 46a, while each of blade inserts 44b includes a lug 45b projecting upwardly from its top edge 46b. Optionally, blade insert 44a may include one or more slits 47a, while blade insert 44b may include one or more slits 47b, slits 47a and 47b extending from the top edge downwardly into body 48a or 48b, respectively, of each blade insert. Blade inserts 44a and 44b are inserted into slots 41c of lower mold half base 41b in an alternating arrangement in which each of blade inserts 44a is between two blade inserts 44b and vice versa, except for the blade closest to each of end walls 42b of lower mold half 40b. When the blade inserts are positioned in lower mold half base 41b, lugs 45a are aligned with one another and lugs 45b are aligned with one another but not with lugs 45a. Conveniently, lugs 45a and 45b are aligned along parallel lines. Also, slits 47a and 47b do not extend to base 41b, but leave a solid portion 49a or 49b, respectively, above base 41b when the blade inserts are in position in the base, as shown in FIG. 4A.

As shown in FIG. 4B, blade inserts 44a and 44b may be withdrawn from mold 40, for ease of removal of a molded capacitor blank. Alternatively, the blade inserts may be fixed within the mold cavity. Also alternatively, both the blade inserts may be provided by removable and replaceable mold inserts set into the lower mold half to define different mold cavity shapes for different electrode spacings and electrode and ceramic layer thicknesses. Thus, a set of differently sized and shaped blade inserts may be used to fabricate a variety of different molded ceramic blanks.

As described above for the molding apparatus shown in FIGS. 2A and 2B, mold halves 40a and 40b are heated for compression molding by means well known in the art for heating molding apparatus. For injection molding, the molding apparatus includes a gate (not shown), as is well known in the art, for filling the mold. Molding of a ceramic blank using mold 40 is performed by compression or injection molding a dielectric material in a manner similar to that described for mold 8 of FIGS. 2A and 2B.

Figure 5:
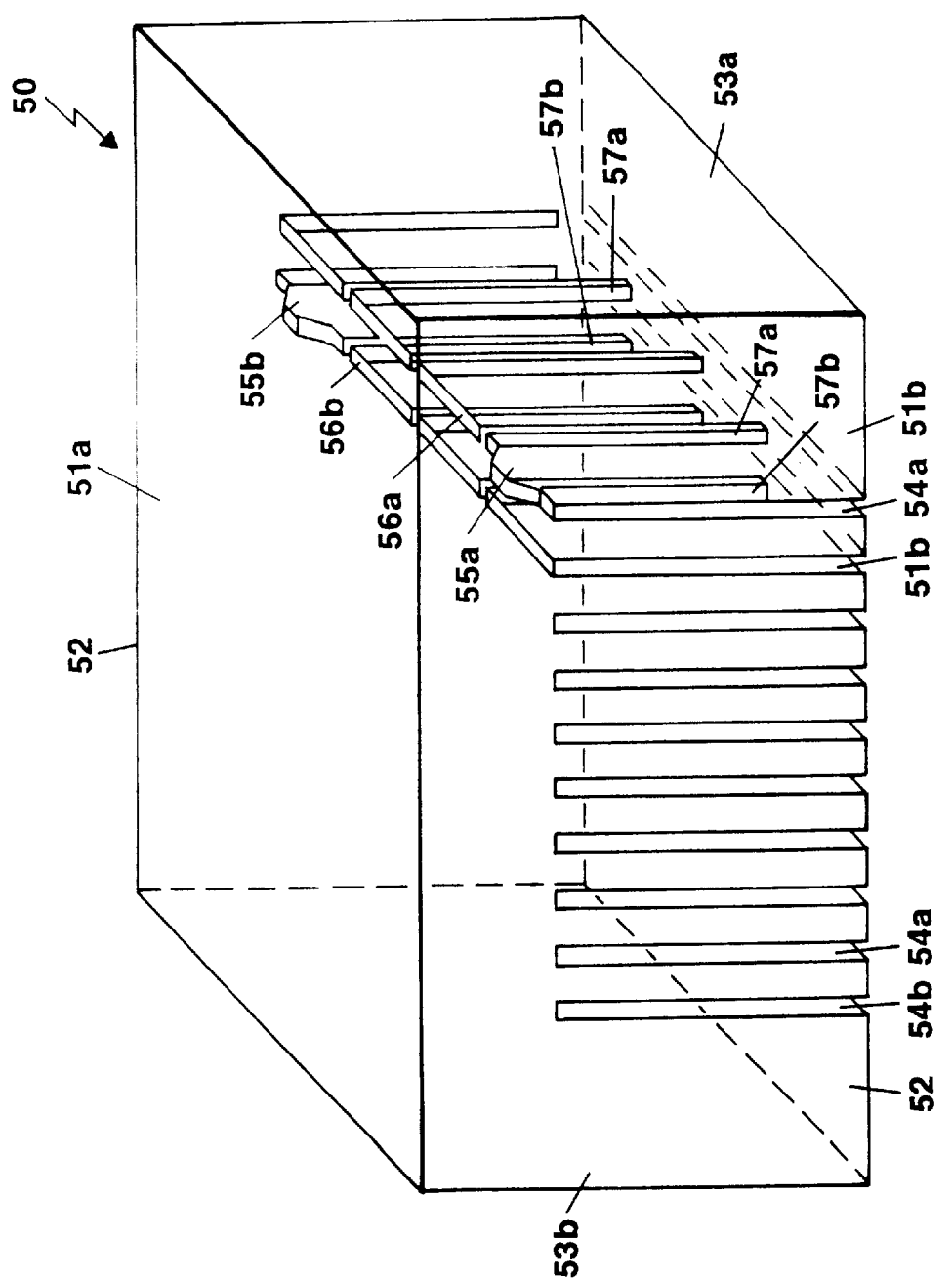
FIG. 5 is a schematic, cross-sectional, perspective view of a sintered barium titanate blank molded in the apparatus shown in FIGS. 4A and 4B, showing two of the internal cavities molded by the tooling shown in FIG. 4A.

An exemplary molded part is illustrated in FIG. 5. Molded barium titanate green body 50 is the negative of the mold cavity of mold 40. After molding, green body 50 is heated to a temperature sufficient to remove the binder from the ceramic, in a manner well known in the ceramic arts. Green body 50 includes upper and lower sides 51a and 51b, respectively, front and rear sides 52, end 53a, and base 53b. Cavities 54a and 54b, corresponding to blade inserts 44a and 44b, respectively, extend into green body 50. (The internal shape of one of each of cavities 54a and 54b is shown, for clarity of illustration.) Extensions 55a and 55b of cavities 54a and 54b, respectively, extend upwardly into green body 50 beyond cavity edges 56a and 56b, respectively, at positions corresponding to those of lugs 45a and 45b of mold 50. Ceramic bridges 57a and 57b interrupt the continuity of cavities 54a and 54b, respectively, at positions corresponding to slits 47a and 47b, respectively, but cavities 54a and 54b extend across the width of green body 50 near lower side 51b, corresponding to blade insert solid portions 49a and 49b.

Green body 50 is sintered, as described above, to a temperature and for a time sufficient to densify the green body to near theoretical density cavities 54a and 54b are vacuum infiltrated with a conductive material, e.g., silver-epoxy resin, also as described above, to completely fill the cavities and cavity extensions with the conductive material. Alternatively, cavities 54a and 54b may be coated with a conductive coating, and may be filled with a conductive or non-conductive material, as described above.

Figure 6:
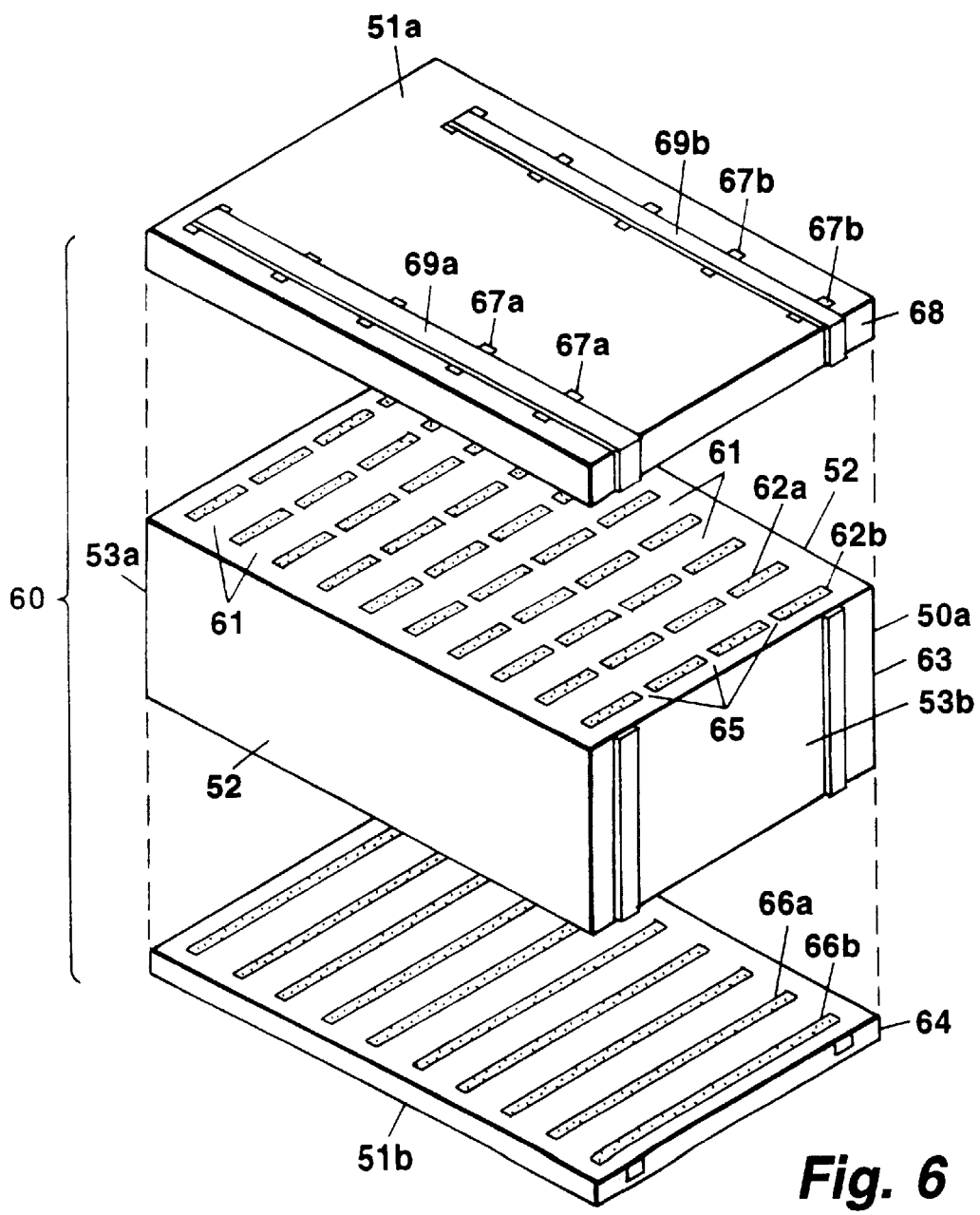
FIG. 6 is an exploded perspective view of a multilayer ceramic capacitor fabricated by filling the internal cavities of the blank shown in FIG. 5, showing the configuration of the electrodes at various y-z planes within the capacitor.

The resulting filled blank is lapped at upper side 51a to expose cavity extensions 55a and 55b and electroded to electrically interconnect alternating electrodes, as shown in FIG. 6. FIG. 6 is a view of multilayer capacitor 60 fabricated from green body 50, sectioned and exploded to show the configuration of electrode layers. Sintered dielectric ceramic body 50a provides a matrix in which dielectric ceramic layers 61 alternate with electrode layers 62a and 62b. Ceramic body 50a is shown in reverse relative to green body 50, i.e., with base 53b to the right, to show one alternative for electroding the capacitor, discussed further below.

In this preferred embodiment, electrode layers 62a and 62b extend nearly, but not completely to front and rear sides 52. Electrode layers 62a and 62b are interrupted throughout main portion 63 of ceramic body 50a, but are continuous across lower body portion 64 near lower side 51b. Thus ceramic bridges 65 are provided across each electrode layer to join ceramic layers 61 and to decrease compliance of the electrode layer, but portions 66a and 66b provide electrical continuity for electrode layers 62a and 62b, respectively.

Lugs 67a and 67b extend upwardly from electrode layers 62a and 62b, respectively, through upper ceramic body portion 68 and are exposed at upper side 51a. Lugs 67a are aligned with one another and are electrically interconnected by conductive strip 69a, while lugs 67b are aligned with one another, but not with lugs 67a, and are electrically interconnected by conductive strip 69b, both conductive strips serving for electrical interconnection to a source of electrical power in a conventional manner. Optionally, conductive strips may extend to base 53b, as shown in FIG. 6, for electrical interconnection. The conductive strips may be applied by, e.g., vapor metallization, sputtering, electroless plating, or screen printing with a conductive ink. Thus, electrode layers 62a are electrically interconnected to one another, and electrode layers 62b are electrically interconnected with one another but electrically isolated from electrode layers 62a to provide an interdigitated or alternating arrangement of internal electrode layers similar to that shown in FIG. 3, but with both sets of electrode layers electrically connectable from a single side or the base of the capacitor.

The invention described herein presents to the art improved large- or fine-scale multilayer capacitors for low or high frequency operation. The capacitors are fabricated by a rapid, low-cost net-shape molding process. Such a fabrication makes possible a multilayer capacitor having a larger number of layers, without bond lines and with no need for high cost co-fired noble metal electrodes. Such capacitors are useful for applications such as electronic circuits, as surface mounted or conventionally-leaded components.

While there has been shown and described what are at present considered the preferred embodiments of the invention, it will be apparent to those skilled in the art that modifications and changes can be made therein without departing from the scope of the present invention as defined by the appended Claims.

We claim:

1. A multilayer capacitor comprising:
   a net-shape molded, densified, unitary dielectric ceramic body comprising a top, four sides normal to said top, and a base interconnecting said sides, and further comprising a plurality of ceramic layers including an uppermost ceramic layer, a lowermost ceramic layer and one or more intermediate ceramic layers all disposed parallel to said top, wherein each intermediate ceramic layer is jointed at one edge to one of said ceramic layers adjacent thereto by a first ceramic bridge and at the same or a different edge to another of said ceramic layers adjacent thereto by a second ceramic bridge;
   a plurality of electrode layers comprising an electrode layer between and bonded to each adjacent pair or said ceramic layers, said electrode layers separating said adjacent pair of ceramic layers, wherein said electrode layers are divided into a first set of electrode layers and a second set of electrode layers, said first set electrode layers alternating with said second set electrode layers in said body, and said electrode layers of each of said sets being electrically interconnected with one another and being electrically isolated from said electrode layers of the other of said sets in said body; and
   said plurality of electrode layers further includes a lower electrode layer on said base, wherein said first set of electrode layers includes said lower electrode layer.

2. A multilayer capacitor in accordance with claim 1 wherein said ceramic body is formed from a dielectric ceramic material selected from the group consisting of titanates of barium and strontium; niobates and zirconates of lead, barium, and strontium; and derivatives thereof.

3. A multilayer capacitor in accordance with claim 1 wherein said first and second electrode layers extend into said ceramic body from, respectively, a first of said sides and a second of said sides opposite said first side; said first electrode layers alternate with said second electrode layers in said ceramic body; and each of said ceramic layers except an uppermost and a lowermost of said layers is joined at one edge to one ceramic layer adjacent thereto by a first ceramic bridge and at an opposite edge to another ceramic layer adjacent thereto by a second ceramic bridge such that said ceramic body has a serpentine cross-section.

4. A multilayer capacitor in accordance with claim 3 wherein said first electrode layers are interconnected by an electrically conductive coating on said first side, and said second electrode layers are interconnected by an electrically conductive coating on said second side.

5. A multilayer capacitor in accordance with claim 4 wherein a first electrically conductive coating on said ceramic body covers said base, said first side, and interfaces between said ceramic layers and said first electrode layers; and a second electrically conductive coating on said ceramic body covers said second sides and interfaces between said ceramic layers and said second electrode layers, said second conductive coating being electrically isolated from said first conductive coating.

6. A multilayer capacitor in accordance with claim 5 wherein said first electrically conductive coating defines a gap in each of said first and second electrode layers; and wherein said gaps are filled with a conductive or non-conductive material completing said first and second electrode layers, respectively.

7. A multilayer capacitor in accordance with claim 6 wherein said conductive or non-conductive material is selected from the group consisting of metals, epoxy resins, metal-polymer resins, rubbers, polyurethanes, and conductive and non-conductive glass frits.

8. A multilayer capacitor comprising:

a net-shape molded, densified, unitary dielectric ceramic body comprising a top, four sides normal to said top, and a base interconnecting said sides, and further comprising a plurality of ceramic layers including an uppermost ceramic layer, a lowermost ceramic layer and one or more intermediate ceramic layers all disposed parallel to said top, wherein each intermediate ceramic layer is joined at one edge to one of said ceramic layers adjacent thereto by a first ceramic bridge and at the same or a different edge to another of said ceramic layers adjacent thereto by a second ceramic bridge;

a plurality of electrode layers comprising an electrode layer between and bonded to each adjacent pair of said ceramic layers, said electrode layers separating said adjacent pair of ceramic layers, wherein said electrode layers are divided into a first set of electrode layers and a second set of electrode layers, said first set electrode layers alternating with said second set electrode layers in said body, and said electrode layers of each of said sets being electrically interconnected with one another and being electrically isolated from said electrode layers of the other of said sets in said body; and wherein:

said first and second electrode layers extend into a first one of said sides, said first electrode layers alternating with said second electrode layers in said capacitor;

said ceramic bridges join said ceramic layers at edges along a second side of said ceramic body opposite said first side such that said ceramic body has a comb-shaped cross-section;

each of said electrode layers includes a lug unitary therewith and comprising an electrically conductive material extending into the bridge adjacent thereto over a minor portion of the length of said bridge, said first lugs aligning with one another, and said second lugs aligning with one another but not with said first lugs;

said lugs are exposed at said second side; and said first lugs are electrically interconnected with one another and said second lugs are electrically interconnected with one another to provide said first and second set, respectively, of electrode layers.

9. A multilayer capacitor in accordance with claim 8 wherein said ceramic body is formed from a dielectric ceramic material selected from the group consisting of titanates of barium and strontium; niobates and zirconates of lead, barium, and strontium; and derivatives thereof.

* * * * *